May 13, 1930. T. D. WILLIAMS 1,758,019
SHEARS
Filed Dec. 12, 1925  4 Sheets-Sheet 1

Witnesses:

Inventor:
THOMAS D. WILLIAMS,
by his Attorney.

May 13, 1930. T. D. WILLIAMS 1,758,019
SHEARS
Filed Dec. 12, 1925  4 Sheets-Sheet 2
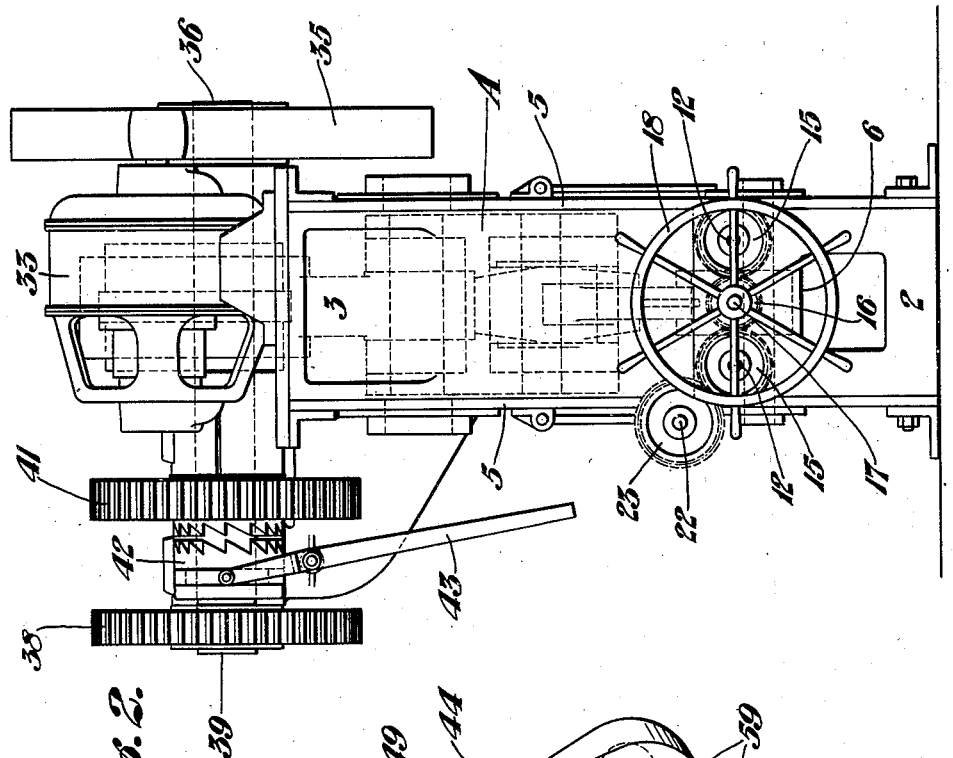
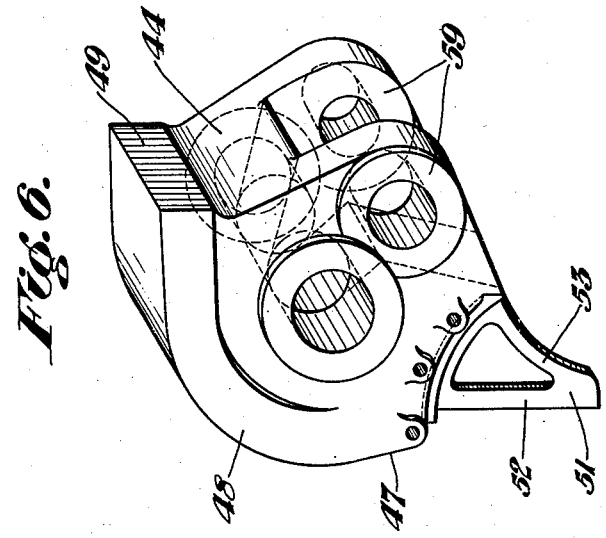

May 13, 1930. T. D. WILLIAMS 1,758,019
SHEARS
Filed Dec. 12, 1925 4 Sheets-Sheet 3
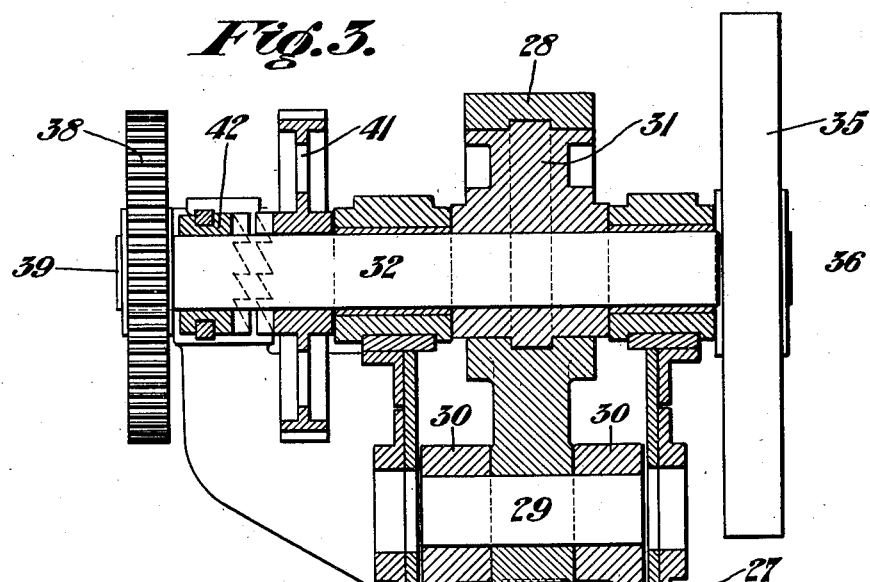
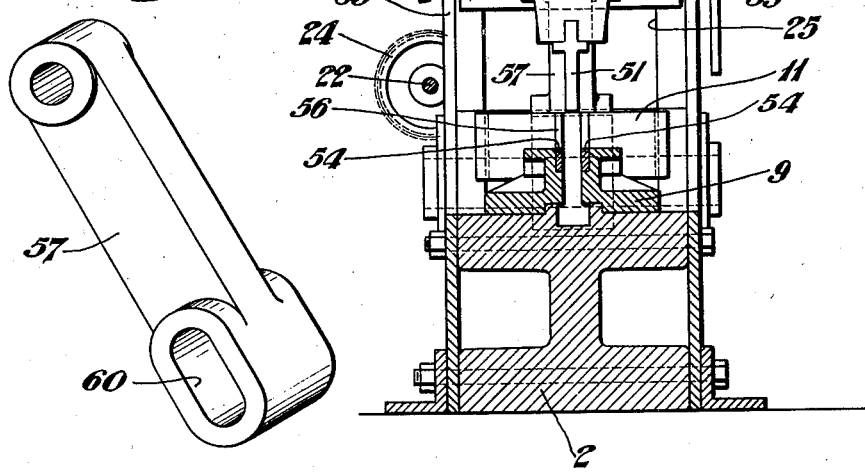
Witness
Edwin Trueb
Inventor:
THOMAS D. WILLIAMS,
by D Anthony Usina
his Attorney.

May 13, 1930.  T. D. WILLIAMS  1,758,019
SHEARS
Filed Dec. 12, 1925   4 Sheets-Sheet 4

Witness
Edwin Trueb

Inventor:
THOMAS D. WILLIAMS,
by: D. Anthony Usina
his Attorney.

Patented May 13, 1930

1,758,019

UNITED STATES PATENT OFFICE

THOMAS D. WILLIAMS, OF CLEVELAND, OHIO

SHEARS

Application filed December 12, 1925. Serial No. 74,977.

This invention relates to shears and more particularly to shears for cutting rolled shapes, and has for one of its objects the provision of a shear of this class that may be used to shear any rolled shapes or flat work-pieces without changing the shear blades.

Another object is to provide a shear in which all thrusts are equalized during the shearing operation.

A further object is to provide a shear having the novel design, construction and combination of parts hereinafter described and illustrated in the accompanying drawings.

In the drawings:

Figure 2 is an end elevation thereof.

Figure 3 is a sectional elevation on the line III—III of Figure 1.

Figure 1:
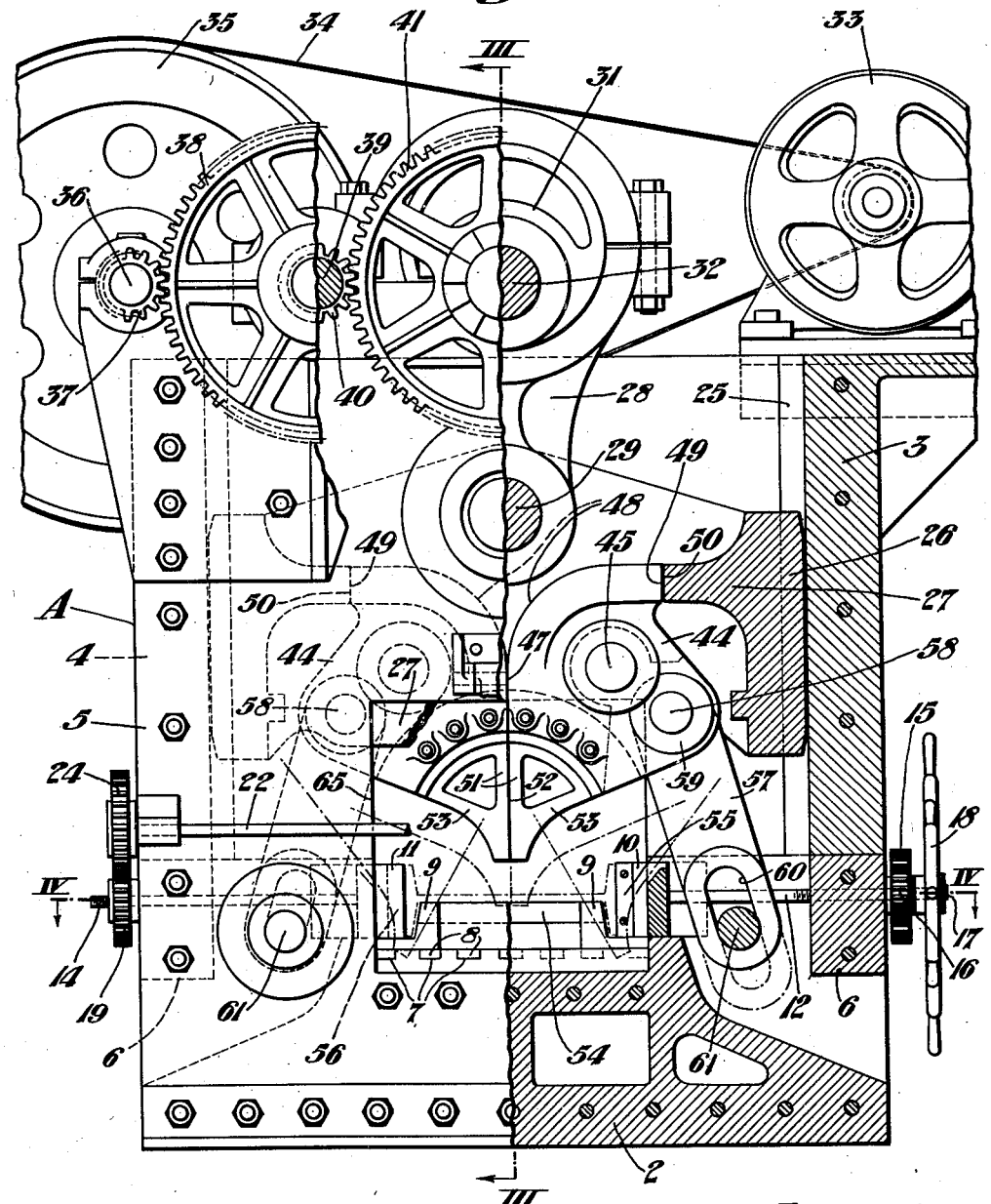
Figure 1 is a side elevation, partly in section, of a shear constructed in accordance with this invention.
Figure 4:
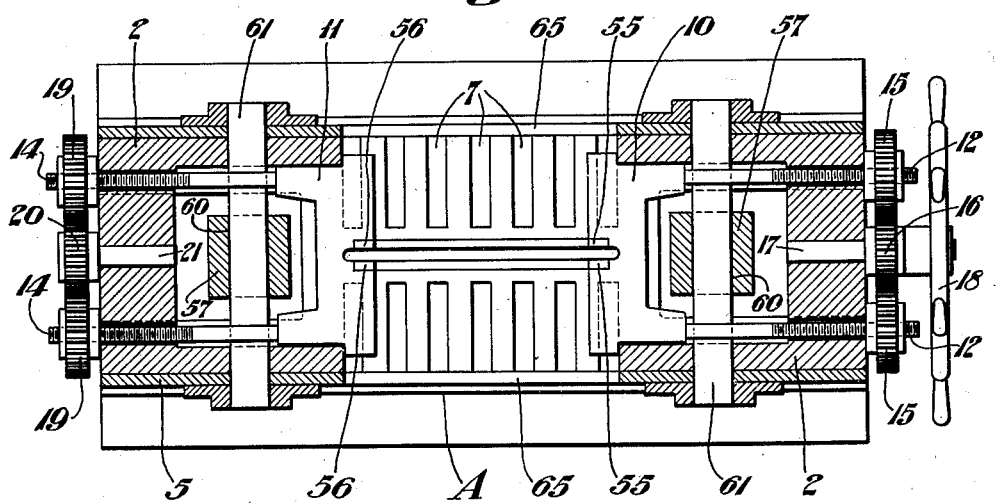
Figure 4 is a sectional plan on the line IV—IV of Figure 1.
Figure 5:
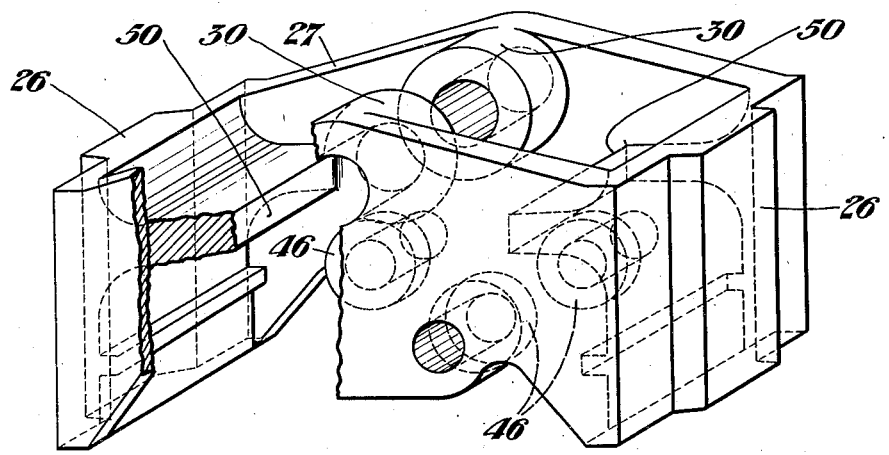

Figures 5, 6, and 7 are perspective views of the cross-head, one of the shear blade heads and one of the control links, respectively.

Referring more particularly to the drawings the letter A designates the shear housing as a whole which is composed of a base member 2, end members 3 and 4, and armor plate side plates 5.

The base 2 is formed as a single casting and is offset at each end at 6 to form seats for the end members 3 and 4, and is provided with a plurality of slots 7 at the center of its upper face to receive centering tongues 8 of suitable shear blocks 9.

Suitable side shear blocks 10 and 11 are slidably mounted on top of the base 2 and connected to screw shafts 12 and 14, respectively. The screw shafts 12 are each provided with pinions 15 which are in mesh with a pinion 16 on a hand-wheel shaft 17 carrying a hand-wheel 18. The screw shafts 14 are each provided with pinions 19 which are in mesh with an idler pinion 20 on a stub shaft 21. A connecting shaft 22 extends across the front of the machine housing and carries pinions 23 and 24. The pinion 23 is in mesh with the forward one of the pinions 15 while the pinion 24 is in mesh with the forward one of the pinions 19, whereby power from the hand-wheel 18 is transmitted simultaneously to both of the side shear blocks so that they may be simultaneously adjusted to suit variable widths of materials to be sheared.

The end members 3 and 4 are slotted vertically at 25 to receive the guide ribs 26 of a cross-head 27 adapted to be reciprocated vertically in the housing A by means of a connecting rod 28. The connecting rod 28 is pivotally connected at one end to a shaft 29 journaled in bearings 30 in the cross-head, and has its other end fitted over an eccentric portion 31 of an operating shaft 32.

A drive motor 33 is mounted on the top of the housing A and is connected by a belt or other connection 34 to a fly-wheel 35 on a shaft 36 which carries a pinion 37 which in turn is in mesh with a gear 38 on a shaft 39. The shaft 39 carries a pinion 40 which meshes with a loose gear 41 on the shaft 32.

Power is transmitted from the loose gear 41 to the operating shaft 32 through a clutch 42 of standard design which is operated by a shifter 43.

The cross-head 27 is hollow to provide for the mounting of shear blade heads 44 which are pivotally mounted on shafts 45 journaled in bearings 46 in the cross-head.

The shear blade heads 44 are arranged so that their inner edge faces abut each other for a portion of their length as at 47, and are then rounded off as at 48, so that when said heads are caused to rotate about the shafts 45 as the cross-head descends, their inner edge faces will rotate on each other and the lower ends of the heads will be moved outwardly away from each other.

The outer faces of the shear blade heads 44 are provided with stop shoulders 49 adapted to engage stop members 50 in the cross-head to limit the turning movement of said heads as the cross-head ascends in the housing.

Shear blades 51 are bolted or otherwise removably secured to the shear blade heads 44 and have their inner edges formed straight as at 52, so as to abut each other when the portions 47 of the heads 44 abut. The outer or cutting faces of the shear blades are curved inwardly and upwardly as at 53 so as to form substantially pointed blades which when in abutting position form a penetrating point which may be forced through the article being sheared.

The shear blocks 9, 10 and 11 are provided with rigid shear blades 54, 55 and 56, respectively, which cooperate with the shear blades 51 when shearing the material or work-piece.

A control link 57 is provided for each of the shear blade heads 44 and said links have their upper ends pivotally mounted on shafts 58 journaled in bearings 59 in the shear blade heads at a point outwardly from and below the shafts 45. The lower ends of the links are slotted as at 60 and fitted over stop shafts or bars 61 mounted in the base member 2. The slots 60 permit a limited free movement of the shear blade heads 44 before the links 57 act.

During the first part of the downward stroke of the cross-head 27, the control links 57 will move freely relative to the fixed stop bars 61, due to the slots 60 and the weight of the links 57 is sufficient to maintain the shear blade heads and shear blades in abutting position.

The side plates 5 are rigidly bolted to the base 2 and end members 3 and 4 to form a rigid structure and said plates are provided with openings 65 to permit the passage of the material or work-piece to be sheared.

In operation, shear blocks 9 of a size to suit the material to be sheared are mounted on the base 2, the material is then inserted through the openings 65 in the housing, and the side shear blocks 10 and 11 are then adjusted to engage the side faces of the material to be sheared. The motor 33 is then energized, and clutch 42 is engaged, to connect the fly-wheel 35 to the shaft 36 which shaft is connected through suitable reducing gearing, described above, to a shaft 32 having an eccentric portion 31 for operating the connecting rod 28 which in turn reciprocates the cross-head 27 in a vertical direction.

The control links 57 operate to cause the shear blade heads 44 and shear blades 51 to maintain a vertical position through the first portion of the downward stroke, until the blades 51 penetrate the material to be sheared. Continued downward movement or stroke of the cross-head 27, shear blade heads 44 and shear blades 51 will force the upper end of the slotted portion of the control links 57 to engage the cross or stop bars 61 and cause the shear blade heads 44 and shear blades 51 to rotate about the shafts 45, thereby spreading the blades 51 outwardly in opposite directions, to shear the material on each side of the center penetrating point simultaneously. Thrusts are thus equalized and all strains are distributed through the cross-head.

While I have shown and described one specific embodiment of my invention, it will be understood that I do not wish to be limited thereto since various modifications may be made without departing from the scope of my invention as defined in the appended claims.

I claim:

1. A shear comprising a housing including a base member, end members and side plates, a cross-head mounted in said housing for vertical reciprocatory movement, a pair of shear blade heads pivotally secured to said cross-head, shear blades secured to said shear blade heads, control links having one end pivotally connected to said shear blade heads and the other end coacting with a fixed stop, means for permitting said links to have a limited free movement relative to said stop and means for reciprocating said cross-head thereby causing said shear blade heads, shear blades and control links to move downwardly until said shear blades penetrate the material to be sheared at which time said links will engage said stop and cause said shear blade heads and shear blades to swing outwardly about the pivotal connection with said cross-head to shear the material.

2. A shear comprising a housing including a base member, end members and side plates, bottom and side shear blocks mounted in said base, means for adjusting said side shear blocks to receive various widths of work, a cross-head mounted in said housing for vertical reciprocatory movement, a pair of shear blade heads pivotally secured to said cross-head, shear blades secured to said shear blade heads, control links having one end pivotally connected to said shear blade heads and the other end connected to a stop bar mounted in said base, means for permitting said links to have a limited free movement relative to said stop bars, and means for reciprocating said cross-head thereby causing said shear blade heads and shear blades to move downwardly until said shear blades penetrate the material to be sheared and said links engage said stop bars, said stop bars and links cooperating to cause said shear blade heads and shear blades to swing outwardly about their pivotal connection with said cross-head as the downward movement of said cross-head is continued, thereby shearing the material.

3. A shear comprising a housing including a base member, end members and side plates, a cross-head mounted in said housing for vertical reciprocatory movement, a pair of shear blade heads pivotally secured to said cross-head, shear blades secured to said shear blade heads, control links having one end pivotally connected to said shear blade heads and the other end connected to a stop bar mounted in said base, means for permitting said links to have a limited free movement relative to said stop bars, and means for reciprocating said cross-head thereby causing said shear blade heads and shear blades to move downwardly until said shear blades penetrate the material to be sheared and said links engage said stop bars, said stop bars and links cooperating to cause said shear blade heads and shear blades to swing outwardly about their pivotal connection with said cross-head as the downward movement of said cross-head is continued, thereby shearing the material.

4. A shear comprising a housing including a base member, end members and side plates, bottom and side shear blocks mounted in said base, means for adjusting both of said side shear blocks toward and away from each other to receive various widths of work, a cross-head mounted in said housing for vertical reciprocatory movement, a pair of shear blade heads pivotally secured to said cross-head, shear blades secured to said shear blade heads, said blades being provided with outer shearing faces and cooperating when closed to form a material penetrating point, means for reciprocating said cross-head, and means connected with said shear blade heads and said housing for swinging said shear blade heads and shear blades outwardly about the pivotal connections of said shear blade heads with said cross-head during the downward movement of said cross-heads and said blades, said last named means remaining inoperative until after said cross-head and said blades have moved downwardly sufficiently to cause said blades to penetrate the material.

5. A shear comprising a housing including a base member, end members and side plates, a cross-head mounted in said housing for vertical reciprocatory movement, a pair of shear blade heads pivotally secured to said cross-head, shear blades secured to said shear blade heads, said blades being provided with outer shearing faces and cooperating when closed to form a material penetrating point, means for reciprocating said cross-head, and means connected with said shear blade heads and said housing for swinging said shear blade heads and shear blades outwardly about the pivotal connections of said shear blade heads with said cross-head during the downward movement of said cross-head and said blades, said last named means remaining inoperative until after said cross-head and said blades have moved downwardly sufficiently to cause said blades to penetrate the material.

6. A shear comprising a housing including a base member, end members and side plates, a cross-head mounted in said housing for vertical reciprocatory movement, a pair of shear blade heads pivotally secured to said cross-head, shear blades secured to said shear blade heads, control links each having one end pivotally connected to said shear blade head and the other end coacting with a fixed stop, means for permitting said links to have a limited free movement relative to said stop, an operating shaft journaled in said housing, an eccentric on said shaft and a connecting rod having one end fitted around said eccentric and its other end pivotally connected to said cross-head, whereby operation of said operating shaft will cause a reciprocation of said cross-head thereby causing said shear blade heads, shear blades and control links to move downwardly until said shear blades penetrate the material to be sheared at which time said links will engage said stop and cause said shear blade heads and shear blades to swing outwardly about the pivotal connection with said cross-head to shear the material.

7. A metal shearing machine comprising a housing, a stationary support for the work, a pair of blades, a holder for each blade, each of said holders being mounted for sliding and pivotal movements relative to said housing, means for moving said holders downwardly through the work while maintaining said blades in proximity with each other, and other means forming a connection between said holders and said housing adapted to cooperate with said first named means to swing said holders and said blades outwardly during the latter part of the downward movement of said holders and blades to complete the shearing operation.

8. A metal shearing machine comprising a housing, a stationary support for the work, a cross-head mounted in said housing for vertical reciprocatory movement, a pair of shear blade heads pivotally mounted on said cross-head, shear blades on said heads, means for reciprocating said cross-head to move said shear blades through the work while maintaining said knives in proximity with each other, and other means forming a connection between said holders and said housing adapted to cooperate with said means for reciprocating said cross-head to swing said shear blade heads about their pivotal mounting during the down stroke of said reciprocating means to complete the shearing operation.

In testimony whereof, I have hereunto signed my name.

THOMAS D. WILLIAMS.